(12) United States Patent
Ye

(10) Patent No.: US 10,780,754 B2
(45) Date of Patent: Sep. 22, 2020

(54) SPRING SUSPENSION

(71) Applicant: Chongqing Richland Mold Corp., Chongqing (CN)

(72) Inventor: Lin Ye, Chongqing (CN)

(73) Assignee: CHONGQING RICHLAND MOLD CORP., Chongqing (CN)

( * ) Notice: Subject to any disclaimer, the term of this patent is extended or adjusted under 35 U.S.C. 154(b) by 58 days.

(21) Appl. No.: 16/048,286

(22) Filed: Jul. 29, 2018

(65) Prior Publication Data
US 2019/0322147 A1    Oct. 24, 2019

(30) Foreign Application Priority Data

Apr. 20, 2018 (CN) .................... 2018 2 0567515 U

(51) Int. Cl.
*B60G 3/20* (2006.01)
*B60G 15/06* (2006.01)
*B60G 7/00* (2006.01)

(52) U.S. Cl.
CPC .............. *B60G 3/20* (2013.01); *B60G 7/001* (2013.01); *B60G 7/008* (2013.01); *B60G 15/062* (2013.01); *B60G 2200/144* (2013.01); *B60G 2204/12* (2013.01); *B60G 2206/10* (2013.01); *B60G 2300/26* (2013.01); *B60G 2800/162* (2013.01)

(58) Field of Classification Search
CPC ........ B60G 3/20; B60G 15/062; B60G 7/008; B60G 7/001; B60G 2800/162; B60G 2200/144; B60G 2204/12; B60G 2300/26; B60G 2206/10; B60G 2300/07; B60G 2206/124; B60G 2200/156; B60G 7/006
See application file for complete search history.

(56) References Cited

U.S. PATENT DOCUMENTS

| 2,085,738 | A | * | 7/1937 | Coleman | ................ | B60G 15/12 |
| | | | | | | 280/124.107 |
| 2,138,438 | A | * | 11/1938 | Wagner | .................... | B60G 3/20 |
| | | | | | | 280/124.109 |
| 2,344,072 | A | * | 3/1944 | Winkelmann | ........... | B60G 9/02 |
| | | | | | | 180/360 |
| 2,907,575 | A | * | 10/1959 | Locker | ................ | B62D 53/062 |
| | | | | | | 280/43.2 |

(Continued)

*Primary Examiner* — Timothy Wilhelm
(74) *Attorney, Agent, or Firm* — Cheng-Ju Chiang

(57) ABSTRACT

A spring suspension includes a support assembly, two shock absorbing columns, two shock absorbing springs, two suspension rocker arms, two connectors and two connecting rods. The two shock absorbing columns are arranged on the support assembly symmetrically. The two suspension rocker arms are arranged on two ends of the support assembly in an opposing manner. Each shock absorbing spring sleeves the corresponding shock absorbing column which is also movably connected to the corresponding connector. Each of the connectors and the corresponding connecting rod are coaxially arranged on a cart body, and an articulation point between the connector and the connecting rod is located between the two shock absorbing columns. Each of the connecting rods is movably connected to the corresponding suspension rocker arm. The spring suspension of the utility model has a simple structure and is capable of improving the off-road performance of a golf cart.

5 Claims, 2 Drawing Sheets

(56) References Cited

U.S. PATENT DOCUMENTS

| | | | | |
|---|---|---|---|---|
| 4,667,974 A | * | 5/1987 | Giese | B60G 5/04 280/683 |
| 5,498,018 A | * | 3/1996 | Wahl | B60G 3/26 280/124.146 |
| 5,560,651 A | * | 10/1996 | Kami | B60G 3/20 180/296 |
| 6,343,666 B1 | * | 2/2002 | Olson | B62M 27/02 180/182 |
| 6,688,616 B1 | * | 2/2004 | Ziech | B60G 7/02 280/86.751 |
| 6,767,022 B1 | * | 7/2004 | Chevalier | B60G 3/20 280/124.136 |
| 6,799,781 B2 | * | 10/2004 | Rasidescu | B62K 5/01 180/311 |
| 6,863,288 B2 | * | 3/2005 | Van Den Brink | B60G 21/007 280/124.103 |
| 6,866,110 B2 | * | 3/2005 | Mallette | B62J 35/00 180/183 |
| 7,000,931 B1 | * | 2/2006 | Chevalier | B60G 3/20 280/124.136 |
| 7,004,484 B1 | * | 2/2006 | Chevalier | B60G 3/20 280/124.134 |
| 7,083,176 B2 | * | 8/2006 | Soles | B60G 7/02 280/86.751 |
| 7,311,167 B2 | * | 12/2007 | Takayanagi | B60G 21/007 180/210 |
| 7,487,985 B1 | * | 2/2009 | Mighell | B62K 5/027 180/210 |
| 7,648,148 B1 | * | 1/2010 | Mercier | B60G 21/007 180/210 |
| 7,722,063 B2 | * | 5/2010 | Dieziger | B60G 3/20 280/124.103 |
| 7,784,805 B2 | * | 8/2010 | Morgan | B60G 3/20 280/124.103 |
| 7,896,371 B2 | * | 3/2011 | Matsuura | B60G 3/20 180/311 |
| 8,485,541 B2 | * | 7/2013 | Pozio | B60G 3/20 280/124.107 |
| 8,517,135 B2 | * | 8/2013 | Schapf | B60G 3/20 180/233 |
| RE44,854 E | * | 4/2014 | Henderson | B62K 5/08 280/124.103 |
| 8,764,040 B1 | * | 7/2014 | DeLauter | B60G 3/20 280/124.135 |
| 8,870,206 B1 | * | 10/2014 | Bandy | B60G 3/20 280/124.135 |
| 9,114,682 B1 | * | 8/2015 | Bandy | B60G 7/02 |
| 9,381,940 B2 | * | 7/2016 | Gale | B60G 21/073 |
| 9,394,014 B2 | * | 7/2016 | Girouard | F16D 55/22 |
| 9,586,613 B2 | * | 3/2017 | Shinbori | B60G 3/20 |
| 9,694,676 B2 | * | 7/2017 | Bandy | B60K 5/02 |
| 10,207,555 B2 | * | 2/2019 | Mailhot | B62D 23/005 |
| 2002/0190494 A1 | * | 12/2002 | Cocco | B60G 21/007 280/124.135 |
| 2004/0021286 A1 | * | 2/2004 | Bombardier | B60G 3/06 280/124.134 |
| 2004/0026146 A1 | * | 2/2004 | Mallette | B62J 35/00 180/183 |
| 2004/0178600 A1 | * | 9/2004 | Wagner | B60G 3/18 280/124.135 |
| 2004/0227321 A1 | * | 11/2004 | Kuroki | B60G 3/02 280/124.135 |
| 2005/0072613 A1 | * | 4/2005 | Maltais | B62M 27/02 180/182 |
| 2005/0077098 A1 | * | 4/2005 | Takayanagi | B60G 21/007 180/215 |
| 2007/0090621 A1 | * | 4/2007 | Vigen | B60G 3/20 280/124.134 |
| 2008/0100018 A1 | * | 5/2008 | Dieziger | B60G 3/20 280/124.103 |
| 2014/0332298 A1 | * | 11/2014 | Girouard | B62M 27/02 180/190 |

* cited by examiner

SPRING SUSPENSION

TECHNICAL FIELD

The utility model relates to the technical field of golf cart suspensions, and more particularly, to a spring suspension.

BACKGROUND

A suspension device of the existing golf cart has a complicated structure and is usually close to the ground, thereby having low passing ability for complicated terrains.

SUMMARY

The technical problem to be solved by the utility model is to provide a spring suspension which has a simple structure and better off-road performance.

To solve said problem, the utility model provides a spring suspension. The spring suspension comprises a support assembly, two shock absorbing columns, two shock absorbing springs, two suspension rocker arms, two connectors and two connecting rods, wherein the two shock absorbing columns are arranged on the support assembly symmetrically; the two suspension rocker arms are arranged on two ends of the support assembly in an opposing manner; each shock absorbing spring sleeves the corresponding shock absorbing column which is also movably connected to the corresponding connector; each of the connectors and the corresponding connecting rod are coaxially arranged on a cart body, and an articulation point between the connector and the connecting rod is located between the two shock absorbing columns; each of the connecting rods is movably connected to the corresponding suspension rocker arm; the two shock absorbing columns are located between the two suspension rocker arms; the support assembly is arched.

Further, a connecting piece which is connected to a steering mechanism is arranged on the suspension rocker arm.

Further, the support assembly comprises a cart body fixing plate, wherein two support rods are articulated to two ends of the cart body fixing plate; the two support rods and the cart body fixing plate form a triangle, and the two support rods are connected to the suspension rocker arms.

Further, a shock absorbing column fixing plate is arranged on the two support rods respectively; the shock absorbing column is movably articulated to the shock absorbing column fixing plate.

Further, a reinforcing rod is also arranged between the two support rods.

Further, each of the connecting rods comprises an arc-shaped body, a linear body and a connecting body, wherein the connecting body and the arc-shaped body are connected via the linear body; a reinforcing plate is arranged at the connection between the linear body and the connecting body; the connecting body is provided with a shaft hole.

Further, each of the connectors comprises a first connecting pipe and a second connecting pipe which are connected; a reinforcing plate is arranged at the connection between the first connecting pipe and the second connecting pipe.

According to the spring suspension of the utility model, the support assembly is arranged in an arc shape, and the suspension rocker arms are arranged on two ends of the support assembly, such that the distance between the tires and the cart body is increased, and the off-road performance is improved, thereby exhibiting high passing ability for complicated terrains. At the same time, the spring suspension is simple in design structure, and is thus convenient for subsequent maintenance.

DETAILED DESCRIPTION

The present invention will be further described below in conjunction with the accompanying drawings.

Figure 1:
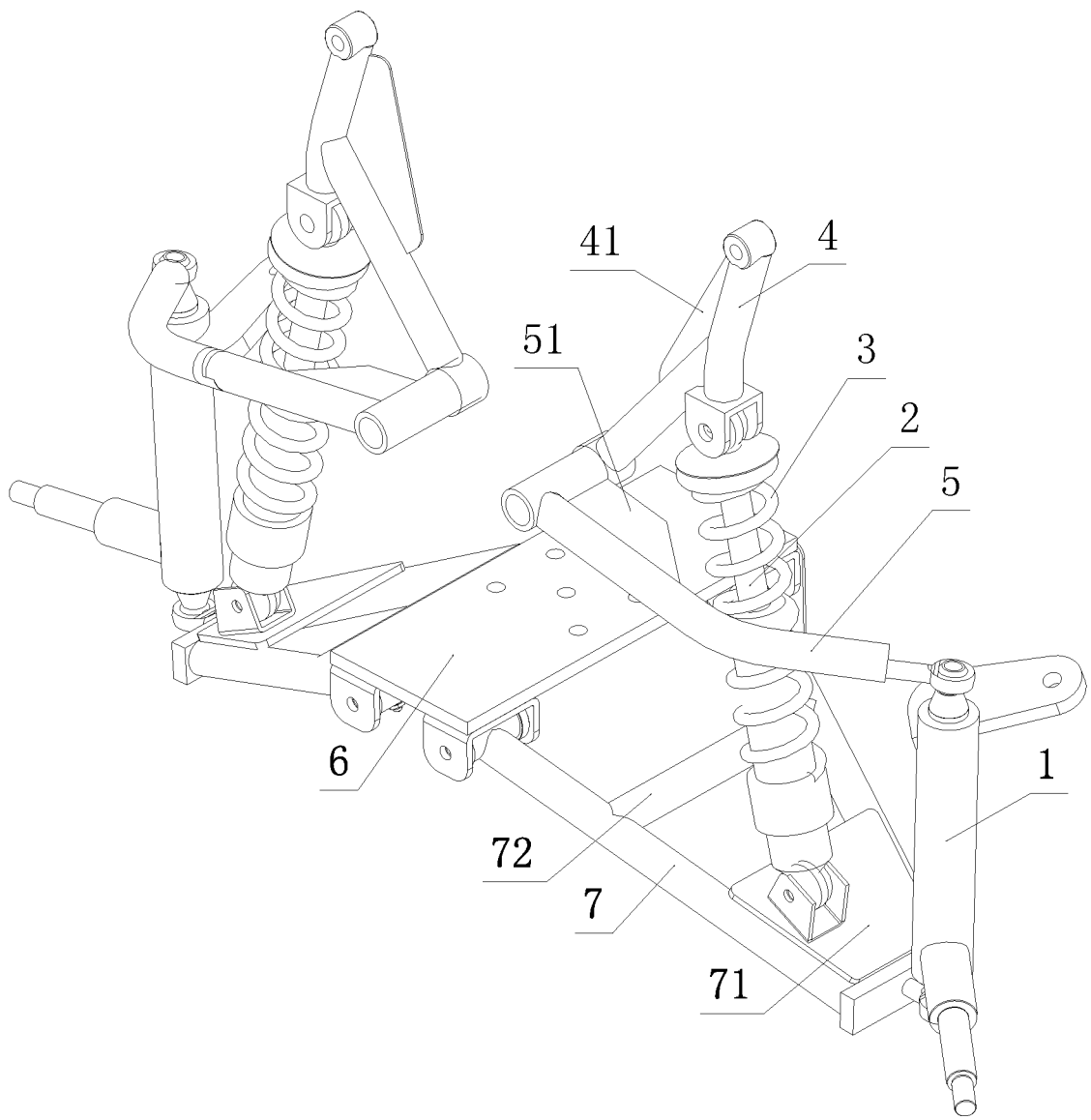
FIG. 1 is a schematic structural diagram of a preferred embodiment of a spring suspension of the utility model.
Figure 2:
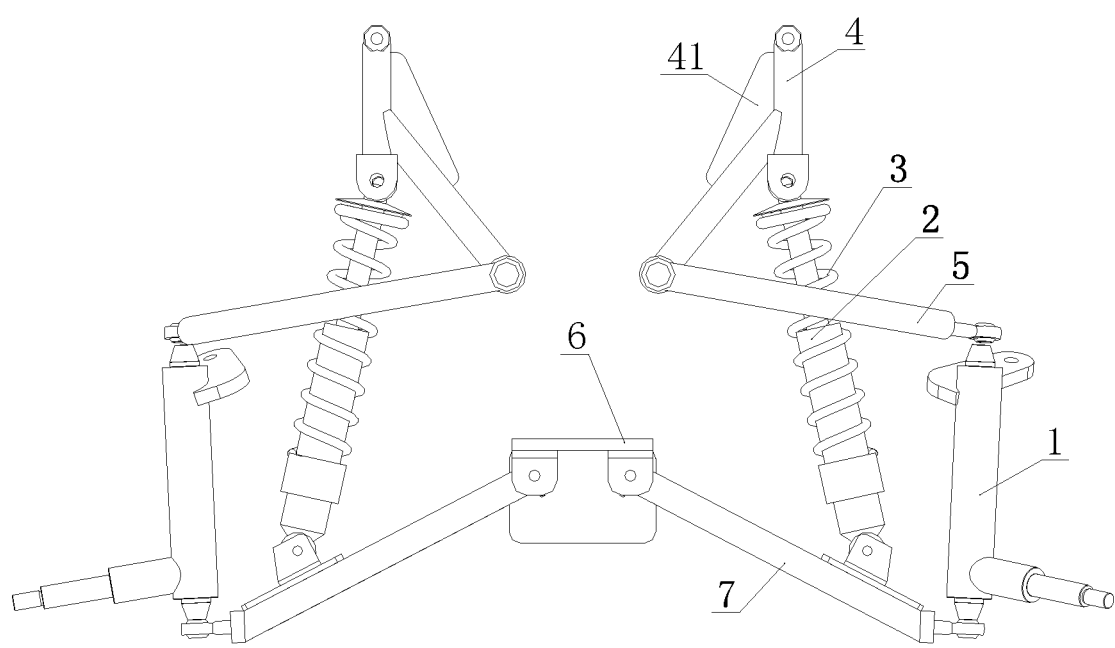
FIG. 2 is a perspective view of the spring suspension of the utility model.

As shown in FIG. 1 and FIG. 2, a preferred embodiment of a spring suspension of the utility model comprises a support assembly, two shock absorbing columns 2, two shock absorbing springs 3, two suspension rocker arms 1, two connectors 4 and two connecting rods 5. The two shock absorbing columns 2 are arranged on the support assembly symmetrically. The two suspension rocker arms 1 are arranged on two ends of the support assembly in an opposing manner. Each shock absorbing spring 3 sleeves the corresponding shock absorbing column 2 which is also articulated to the corresponding connector 4. The upper end of the connector 4 is connected to a cart body, the lower end of the connector 4 and the corresponding connecting rod 5 are coaxially arranged on the cart body, and an articulation point between the connector 4 and the connecting rod 5 is located between the two shock absorbing columns 2 to improve a shock absorbing effect. Each of the connecting rods 5 is movably connected to the corresponding suspension rocker arm 1. The two shock absorbing columns 2 are located between the two suspension rocker arms 1, such that the structural configuration is reasonable. A connecting piece which is connected to a steering mechanism is arranged on the suspension rocker arm 1 to steer the tires. The spring suspension is connected to the cart body more stably through a plurality of connection points, and is thus more suitable for the cart body than the existing suspensions.

The support assembly is arched to increase the drop between a tire and the cart body and improve the off-road performance. The support assembly comprises a cart body fixing plate 6. An articulation base is arranged on two ends of the cart body fixing plate 6 respectively. Each of the support rods 7 is articulated to the corresponding articulation base to improve a shock absorbing effect. The two support rods 7 and the cart body fixing plate 6 form a triangle (when viewed from the top) to increase the stability of the support assembly. The two support rods 7 are connected to the suspension rocker arms 1 through the fixing plate. A shock absorbing column 2 fixing plate to which each of the shock absorbing columns 2 is movably articulated is arranged on the two support rods 7 respectively. A reinforcing rod 72 is also arranged between the two support rods 7 to increase the strength of the support assembly.

Each of the connecting rods 5 comprises an arc-shaped body, a linear body and a connecting body. The connecting body and the arc-shaped body are connected via the linear body. A reinforcing plate 51 is arranged at the connection between the linear body and the connecting body to increase the strength of the connecting rod 5. The connecting body is provided with a shaft hole. The shaft hole and the connecting body are coaxially arranged on the cart body. A connection sleeve in which a spherical member is arranged is arranged on the arc-shaped body. The spherical member is fixed on the suspension rocker arm 1 via a bolt. The connection sleeve may rotate with respect to the spherical member to realize movable connection and facilitate shock absorption when a shock appears.

Each of the connectors 4 comprises a first connecting pipe and a second connecting pipe which are connected. A reinforcing plate 41 is arranged at the connection between the first connecting pipe and the second connecting pipe to increase the strength of the corresponding connector 4.

The support assembly is arranged in an arc shape, and the suspension rocker arms 1 are arranged on two ends of the support assembly, such that the distance between the tires and the cart body is increased, and the off-road performance is improved, thereby exhibiting high passing ability for complicated terrains. At the same time, the spring suspension is simple in design structure and is thus convenient for subsequent maintenance. In addition, the articulation and the movable connection are adopted at a plurality of points to improve the shock absorbing performance and make a driver more comfortable.

The above content just describes the embodiment of the utility model, and is thus not intended to limit the patent scope of the utility model. The equivalent structures, which are made by using the description and the content of the drawings of the utility model and are directly or indirectly applied to other related technical fields, shall fall within the patent protection scope of the utility model.

The invention claimed is:

1. A spring suspension, comprising a support assembly, two shock absorbing columns, two shock absorbing springs, two suspension rocker arms, two connectors and two connecting rods, wherein the two shock absorbing columns are arranged on the support assembly symmetrically; the two suspension rocker arms are arranged on two ends of the support assembly in an opposing manner; each shock absorbing spring sleeves the corresponding shock absorbing column which is also movably connected to the corresponding connector; each of the connectors and the corresponding connecting rod are coaxially arranged on a cart body, and an articulation point between the connector and the connecting rod is located between the two shock absorbing columns, each of the connectors comprises a first connecting pipe and a second connecting pipe which are connected; a reinforcing plate is arranged at the connection between the first connecting pipe and the second connecting pipe; each of the connecting rods is movably connected to the corresponding suspension rocker arm; the two shock absorbing columns are located between the two suspension rocker arms; the support assembly is arched, each of the connecting rods comprises an arc-shaped body, a linear body and a connecting body, wherein the connecting body and the arc-shaped body are connected via the linear body; a reinforcing plate is arranged at the connection between the linear body and the connecting body; the connecting body is provided with a shaft hole.

2. The spring suspension according to claim 1, wherein a connecting piece which is connected to a steering mechanism is arranged on the suspension rocker arm.

3. The spring suspension according to claim 1, wherein the support assembly comprises a cart body fixing plate, wherein two support rods are articulated to two ends of the cart body fixing plate; the two support rods and the cart body fixing plate form a triangle, and the two support rods are connected to the suspension rocker arms.

4. The spring suspension according to claim 3, wherein a shock absorbing column fixing plate is arranged on the two support rods respectively; the shock absorbing column is movably articulated to the shock absorbing column fixing plate.

5. The spring suspension according to claim 3, wherein a reinforcing rod is arranged between the two support rods.

* * * * *